United States Patent [19]

Norris

[11] Patent Number: 4,650,197

[45] Date of Patent: Mar. 17, 1987

[54] HAND TROLLEY

[76] Inventor: Terrence W. Norris, 31 Guede Court Avenue, Earlwood, New South Wales, 2206, Australia

[21] Appl. No.: 648,165

[22] PCT Filed: Dec. 22, 1983

[86] PCT No.: PCT/AU83/00191
§ 371 Date: Aug. 21, 1984
§ 102(e) Date: Aug. 21, 1984

[87] PCT Pub. No.: WO84/02499
PCT Pub. Date: Jul. 5, 1984

[30] Foreign Application Priority Data

Dec. 23, 1982 [AU] Australia ............................... PF7435

[51] Int. Cl.$^4$ ........................... B62B 1/22; B62B 5/02
[52] U.S. Cl. ................................... 280/5.24; 180/8.2; 188/42; 188/174; 188/176; 280/47.29
[58] Field of Search ..................... 280/5.24, 5.3, 5.2, 280/29, 10, 38, 43.1, 47.21, 47.27, 47.28, 47.29, 645; 414/786, 444; 180/8.2; 254/2 R

[56] References Cited

U.S. PATENT DOCUMENTS

| 1,965,944 | 7/1934 | Lea | 280/38 |
| 1,972,367 | 9/1934 | Willard | 188/42 |
| 2,459,275 | 1/1949 | Gates | 280/5.24 |
| 2,467,644 | 4/1949 | Wright et al. | 280/5.24 |
| 2,635,887 | 4/1953 | Menne | 280/5.24 |
| 4,275,894 | 6/1981 | Mortenson | 280/47.29 X |

FOREIGN PATENT DOCUMENTS

| 533940 | 12/1956 | Canada | 280/47.29 |
| 340766 | 10/1959 | Switzerland | 280/47.28 |

Primary Examiner—John J. Love
Assistant Examiner—Mitchell J. Hill
Attorney, Agent, or Firm—Anthony A. O'Brien

[57] ABSTRACT

A hand trolley for ascending and descending stairs is disclosed as including an elongated frame with a pair of outer rails and a pair of inner rails being spaced from the outer rails, a pair of wheels mounted on the frame at one end of the outer rails with a handle mounted on the frame at the other end of the outer rails, load supporting feet carried by the frame adjacent the wheels to define a primary load support, a carriage slidably mounted on the inner rails and defining a secondary load support, and brake shoes are operative to lock the carriage in a fixed position.

4 Claims, 7 Drawing Figures

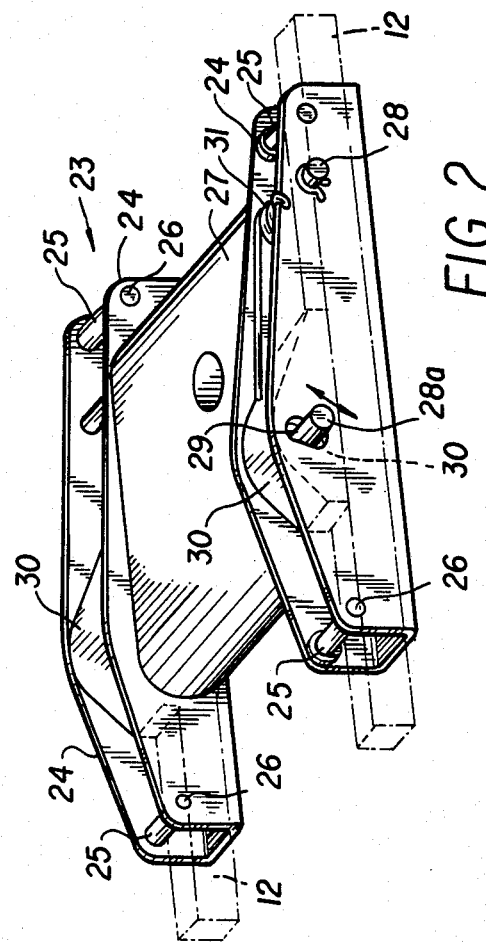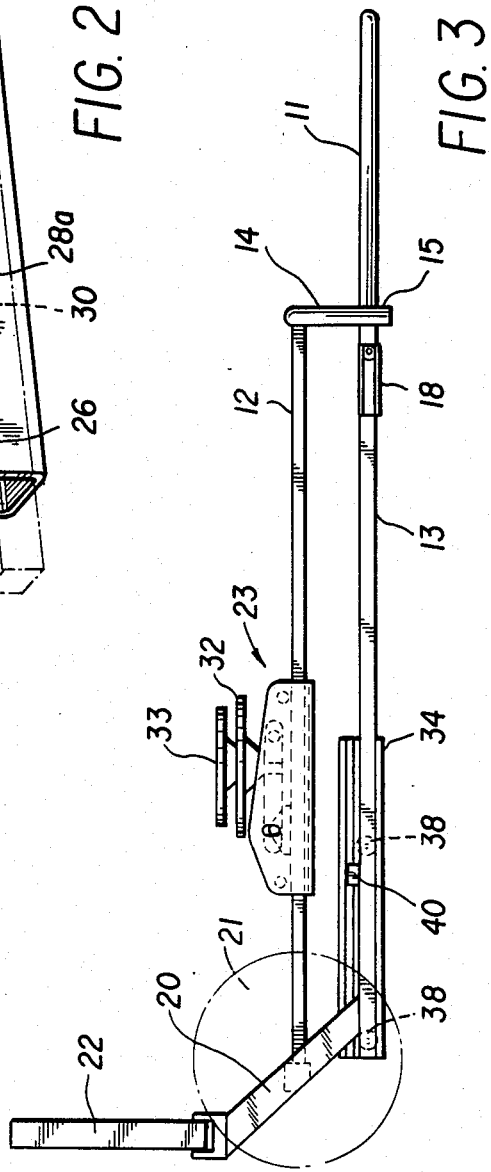

HAND TROLLEY

This invention has been primarily devised for the lifting and transporting of television receivers but as will be clear from the following description the trolley can be used for other equipment.

Television receivers have special features making it diffucult for a single person to handle the larger screened models. The larger television receivers are very heavy, they have a fragile screen and the shape of the receiver makes it difficult to embrace them for carrying. The shape and size of the larger screened models when coupled with their considerable weight makes it difficult to manoeuvre them through conventional doorway openings. The present invention overcomes the above problems.

Broadly, the invention can be said to provide a trolley comprising an elongated frame, a pair of ground engaging wheels with a common axis of rotation located adjacent one end of the frame and projecting below the frame, a handle at the other end of the frame, a pair of first frame rails occupying a common plane and extending longitudinally of the frame so as to be at right angles to the axis of rotation of the wheels, a carriage captive on said first frame rails and slidable therealong with first supporting means on the carriage located above the frame, second supporting means on the frame adjacent said one end thereof to combine with the first supporting means to support a load when it is transported on the trolley, stair climbing means on the trolley, said stair climbing means comprising two elongated sliders mounted on the frame so as to be longitudinally movable relative to the frame, resilient biassing means biassing the sliders towards said other end of the trolley frame against stop means with step engaging surfaces on the sliders positioned in a common plane below said frame.

A presently preferred embodiment of the invention will now be described with reference to the accompanying drawings in which:

FIG. 2 is a perspective view of the carriage of the trolley of FIG. 1,

FIG. 3 is a side view of the trolley,

Figure 1:
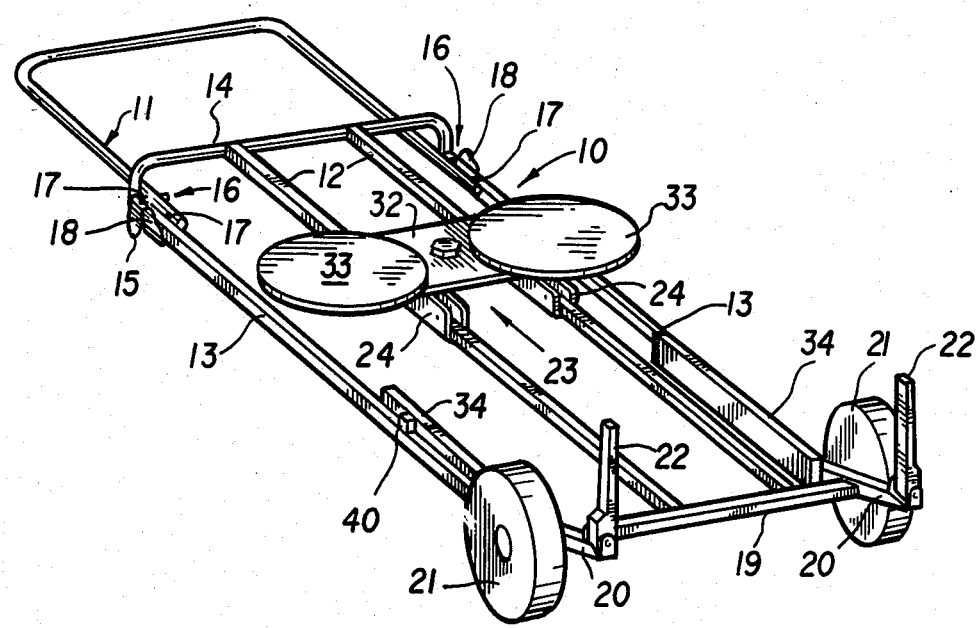
FIG. 1 is a perspective view of the trolley according to the invention.

As illustrated the trolley comprises a frame with a body part 10 and a handle part 11. The body part comprises a first pair of rails 12 which are tubular and square in section and parallel and lie in a common plane and a further pair of rails 13 which are also tubular and square in section and parallel and lie in a common plane parallel to the plane occupied by the rails 12 but lower relative to the ground, as shown in FIG. 1. The rails 12 and 13 are joined by an arched end member 14 with extended ends to provide feet 15. The handle part 11 is of U form and is made of circular cross-section tube with the free ends of the U legs pivotally connected at 16 to the rails 13 and the U legs are housed in notched lugs 17 on the rails 13. The U legs are retained in the notches of the notched lugs 17 by means of draw bolts and cam faced levers 18 both for the extended configuration where the U member provides a handle and for the folded condition where the U member legs lie closely adjacent and parallel to the further rails 13.

At the other ends of the rails 13 there are rail extensions 20 joined by a bar 19. The axis of the bar 19 is also the axis of stub axles on which two wheels 21 are rotatably mounted. There are elongated feet 22 hingedly connected to the respective rail extensions 20 allowing the feet to project at right angles to the planes occupied by the rails 12 and 13 or to be folded down in a storage condition where the feet lie parallel to each other and the bar 19.

There is a carriage 23 slidably mounted on the rails 12. The carriage comprises two sleeves or channels 24 and preferably each channel has a rubbing strip of low friction plastics material such as nylon fixed to the inner surface of the channel base. The channels are retained on the rails 12 by flanged rollers 25 supported by axles 26 extending between the legs of the channels. There is a mounting plate 27 positioned between the channels and it is pivotally supported at one end on a shaft 28 passing through the two channels where it is retained by end circlips or the like. At its other end the mounting plate 27 has a through hole to receive a shaft 28a which has its ends housed in elongated holes 29 in the legs of the channels 24. Also mounted on the shaft 28 and in the channels there are brake shoes 30 with friction material on the underfaces to bear upon the upper faces of the rails 12. A torsion spring 31 is provided to urge the brake shoes 30 against the rails 12.

The carriage has a mounting assembly thereon comprising a suction cup holder 32 connected by a bolt to the mounting plate 27 in a manner permitting the holder 32 to be rotated against a friction resistance relative to the mounting plate 27. There are two conventional suction cups 33 with cam operating levers mounted on the holder 32. More than two suction cups can be used if desired.

As will be readily understood when a load is secured to the carriage by the suction cups and the trolley is elevated so the rails are generally upright there will be a lever action as the weight of the load tends to rotate the mounting plate 27 about the rod 28. This will force the brake shoes 30 against the rails 12 thereby locking the carriage in position on the rails 12. This feature is of importance where, for example, a television receiver is to be taken from a table. The trolley would be wheeled up to the television receiver and the carriage is raised until the suction cups can be locked onto the screen. Then by tilting the trolley backwards the weight of the television receiver, once free of the table, will cause the brake shoes 30 to bear firmly on the rails 12 thereby preventing the carriage from moving down the rails 12. Subsequently the trolley would then be placed in a position where the rails are parallel to the ground. By raising the mounting plate 27 against the action of the torsion spring 31 the carriage can be slid along the rails until the television receiver comes to rest on the feet 22. When the trolley is raised for the transport of the television receiver to a required location the weight of the television receiver will be supported on the feet 22. The rotational capability of the suction cup holder 32 allows the television receiver to be placed in an orientation such that it can pass through a doorway, which my not be possible if the receiver had to maintain the orientation in which it was picked up from a table.

Figure 4:
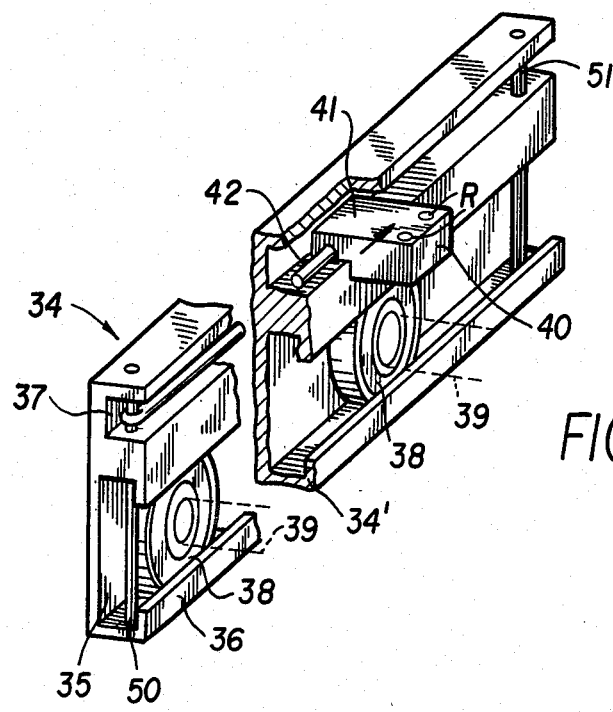
FIG. 4 is an enlarged partly fragmentary perspective view of a slider member used in the step climbing operation of the trolley.

The stair climbing feature of the trolley is important. There are two elongated sliders or slider members 34 mounted on the rails 13. Each slider has a first track or channel 35 therealong with inturned flanges 36 and a second track or channel 37 therealong. The channel 35 is shaped and dimensioned to receive two rollers 38 (preferably ball bearings) mounted on pins 39 projecting sideways from the rails 13. The flanges 36 prevent the sliders from lateral disengagement from the rollers 38. There are two lugged blocks 40 respectively fixed, such as by means of rivets R or other suitable fasteners, to the rails 13 with the lugs 41 thereof in the respective channels 37. A resilient member 42, either a tension spring or a length of rubber or the like, is fixed to each lug 41 and to the remote end of the slider 34 (in this case to a stop pin 50 through the slider 34) to cause engagement between the stop pin 50 and the adjacent roller 38. There is a second stop pin 51 through the slider 34, the stop pins 50 and 51 prevent the slider from longitudinal disengagement from the rollers, as will be clear from FIG. 4. It is to be noted that the underfaces or lower bearing face 34' of the sliders 34 are no lower, relative to the ground when the trolley is horizontal, than the points on the peripheries of the wheels 21 in contact with the ground. This is a feature required for the stair climbing function of the trolley.

Figure 7:
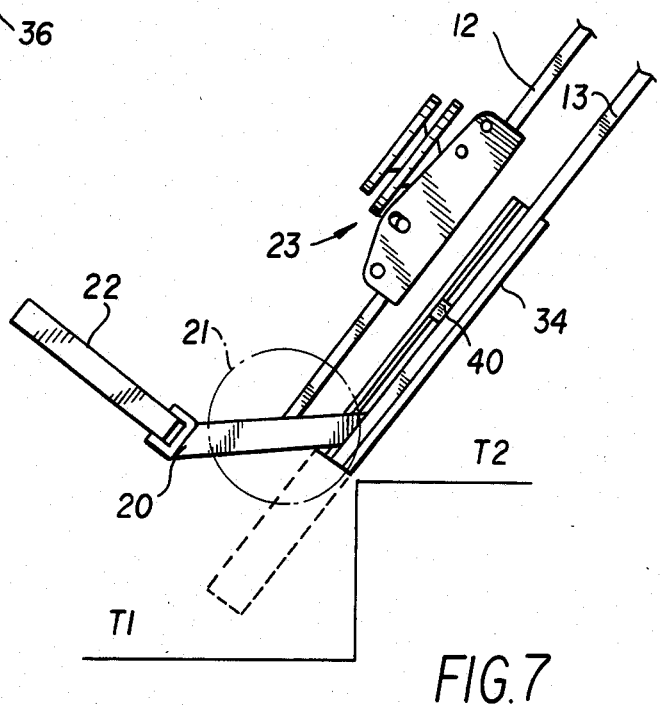
FIG. 6 is a view similar to FIG. 5 at a later stage in the step climbing operation and FIG. 7 is a view similar to FIG. 5 showing the last stage in the step climbing operation.
Figure 5:
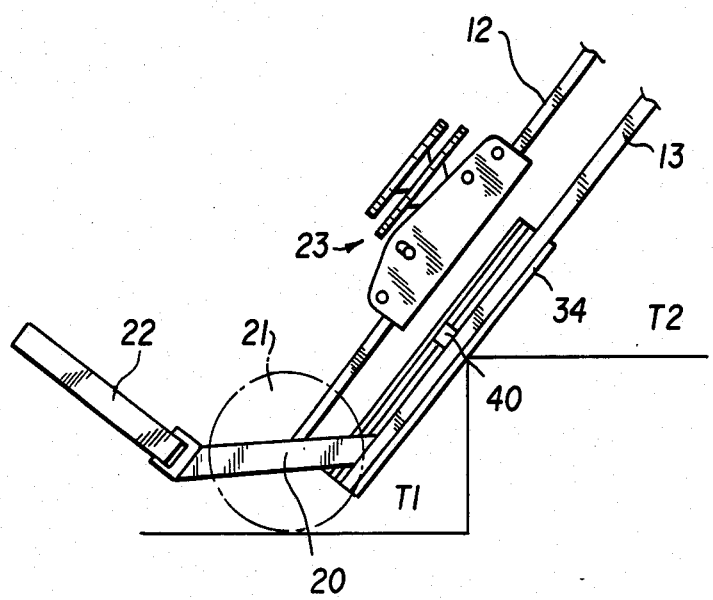
FIG. 5 is diagrammatic view of a first position in a step climbing operation of the trolley.
Figure 6:
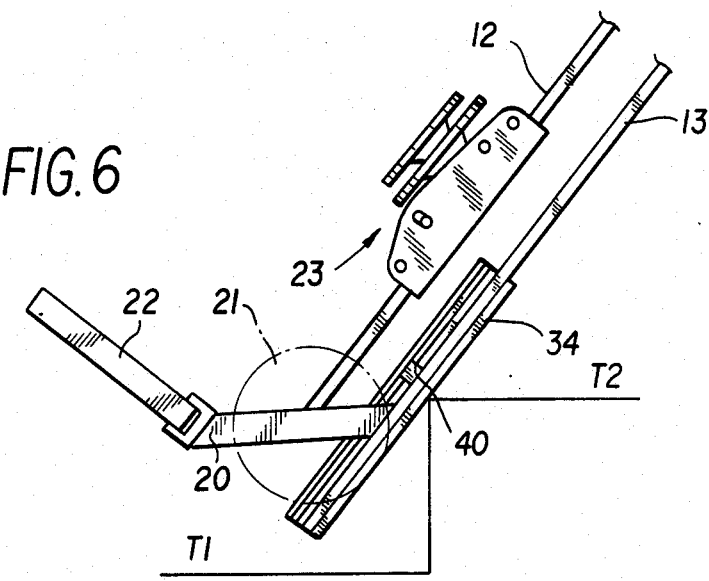

In a stair climbing operation, as shown in FIGS. 5 to 7, the wheels 21 would be pulled across the tread T1 of one step until the underfaces of the sliders 34 rest upon the front upper edge of the next step up. The trolley would then be pulled rearwardly upwardly and the sliders 34, now firmly bearing against the step front upper edge, will remain stationary with the rollers 38 and the blocks 40 moving with the attached trolley frame in the direction of the arrow in FIG. 4 thereby tensioning the biasing member 42. The intermediate stage in the step climb is shown in FIG. 6. During the upward movement of the trolley the wheels, being lower than the sliders, will contact the step edge on which the sliders bear, as shown in FIG. 7. Continued upward rearward movement of the trolley will result in the wheels raising the sliders 34 from the step edge and their resilient return to their rest position with the stop pin 50 bearing on the roller 38. The slider position immediately before release from the step edge is shown in dotted outline and the rest position after contraction of the biasing member 42 is shown in full lines. The trolley would then be wheeled across the tread T2 of the next step and the process repeated.

In a stair descending procedure the trolley would be wheeled over the edge of the step to be descended to cause the sliders to come to rest on the step edge. The trolley frame cannot move relative to the slider 34 due to the roller 38 bearing hard against the stop 50 and the result is that the sliders slide across the edge of the step until the wheels 21 come into contact the the tread T1 of the next lower step. The frictional resistance to movement of the slider over the step edge acts as a brake to the trolley descent which, when combined with the smoothness of the sliding action, provides a controlled, shockless and readily achieved descent from one step to the next. It is possible with the use of the stair climber as described to transport heavy delicate apparatus, such as large television receivers, up and down a stairway in a shockfree manner.

I claim:

1. A hand trolley having stair climbing means and comprising an elongated frame, a pair of ground engaging wheels mounted adjacent one end of the frame for rotation about a common axis lateral to the length direction of the frame, primary load supporting means upstanding from the frame adjacent said wheels, a handle at another end of the frame, two pairs of rollers fixed relative said frame with the rollers of each said pairs of rollers spaced apart in the length direction of the frame and having axes of rotation parallel to each other and to the axis of rotation of said wheels, two elongated stair climbing slider members each including track means extending in the length direction of the slider member, said slider members respectively movably mounted on and held captive to said rollers of said pairs of rollers so as to be movable from a rest position in a direction away from said handle and thereafter return to the rest position, stop means fixed to said slider members respectively engageable by said rollers of said pairs of rollers to define the rest position for said slider members, resilient means housed in said track means, said resilient means biasing said slider members toward said rest position, a lower bearing face on each said slider member disposed in a plane spaced from the center of rotation of said ground engaging wheels by a distance no greater than the radius of said ground engaging wheels said frame including rail means in the length direction of the frame, a carriage captive on said rail means and slidable therealong, brake means to locate said carriage at a predetermined position in its path of travel along said rail means and secondary load support means on said carriage.

2. A hand trolley as claimed in claim 1 wherein said secondary load support means is rotatable on said carriage about an axis at right angle to the plane in which said secondary support means moves on said rail means.

3. A hand trolley as claimed in claim 2 wherein said secondary support means includes load retaining suction cups.

4. A hand trolley as claimed in claim 4 wherein said rail means comprises two parallel rails, said carriage including a mounting plate, two sleeves respectively engaging said two rails, a pivotal connection between said mounting plate and sleeves with the axis of pivot parallel to the axis of rotation of said ground engaging wheels and at the end of said mounting plate toward said handle, brake shoes on said mounting plate respectively overlying said rails and located at end of the mounting plate toward said wheels, and said secondary support means connected to said mounting plate intermediate said pivotal connection and said brake shoes.

* * * * *